United States Patent
Matsubara

(10) Patent No.: US 8,671,159 B2
(45) Date of Patent: *Mar. 11, 2014

(54) TECHNIQUE FOR PREVIOUSLY PROVIDING ESTIMATE OF TIME REQUIRED FOR PROCESSING

(71) Applicant: International Business Machines Corporation, Armonk, NY (US)

(72) Inventor: Takeshi Matsubara, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/950,770

(22) Filed: Jul. 25, 2013

(65) Prior Publication Data

US 2013/0311552 A1 Nov. 21, 2013

Related U.S. Application Data

(63) Continuation of application No. 12/342,139, filed on Dec. 23, 2008, now Pat. No. 8,549,100.

(30) Foreign Application Priority Data

Dec. 26, 2007 (JP) ................................. 2007-334693

(51) Int. Cl.
*G06F 15/16* (2006.01)
*H04M 3/00* (2006.01)

(52) U.S. Cl.
USPC .......................................... 709/217; 709/203

(58) Field of Classification Search
USPC ................... 709/201–203, 217–219
See application file for complete search history.

(56) References Cited

U.S. PATENT DOCUMENTS

| 5,615,121 A | 3/1997 | Babayev et al. |
| 5,657,450 A * | 8/1997 | Rao et al. ............................. 1/1 |
| 5,774,356 A | 6/1998 | Hisatake et al. |

(Continued)

FOREIGN PATENT DOCUMENTS

| JP | 2000276471 A | 10/2000 |
| JP | 2002073352 A | 3/2002 |
| JP | 2003203031 A | 7/2003 |
| JP | 2003263409 A | 9/2003 |

OTHER PUBLICATIONS

12342139-PDF from public pair of parent case, U.S. Appl. No. 12/342,139 as of Aug. 20, 2013.

(Continued)

*Primary Examiner* — Thai Nguyen
(74) *Attorney, Agent, or Firm* — George R. McGuire; Blaine T. Bettinger; Bond Schoeneck & King, PLLC

(57) ABSTRACT

Methods and systems for communicating information between a server device and one or more client devices. The client device comprises a transmitter to transmit a processing request to the server device in response to an input operation by a user, a display to display an object on a screen which can receive the input operation from the user, and an obtaining section to obtain from the server device both an initial estimate of time required for processing that will be executed by the server device in response to the processing request, and one or more updated estimates of required processing time if a certain amount of time has elapsed since the previous estimate.

20 Claims, 8 Drawing Sheets

(56) References Cited

U.S. PATENT DOCUMENTS

| | | | |
|---|---|---|---|
| 6,724,764 B2 * | 4/2004 | Bondarenko et al. | 370/401 |
| 6,970,931 B1 | 11/2005 | Bellamy et al. | |
| 7,174,011 B2 * | 2/2007 | Kortum et al. | 379/266.06 |
| 7,188,146 B1 | 3/2007 | Tsukada | |
| 7,525,549 B1 | 4/2009 | Diard et al. | |
| 2003/0177229 A1 | 9/2003 | Akasaka | |
| 2003/0221000 A1 | 11/2003 | Cherkasova et al. | |
| 2005/0008141 A1 | 1/2005 | Kortum et al. | |
| 2005/0080872 A1 * | 4/2005 | Davis et al. | 709/217 |
| 2005/0223069 A1 | 10/2005 | Cooperman et al. | |
| 2006/0132607 A1 | 6/2006 | Kimber et al. | |
| 2007/0165266 A1 | 7/2007 | Tian | |
| 2009/0006071 A1 | 1/2009 | Dournov et al. | |
| 2009/0037520 A1 | 2/2009 | Loffredo | |

OTHER PUBLICATIONS

Java EE, http://sdc.sun.co.jp/java/javaee/index.html, Copyright 1994-2008 Sun Microsystems, Inc.

Chinnici, Java API for XML-based RPC 1.1 Version 1.1, FCS, Maintenance Release, Oct. 14, 2003, 2003 Sun Microsystems, Inc.

Shannon, Java Platform, Enterprise Edition (Java EE) Specification, v5, May 8, 2006, 2006 Sun Microsystems, Inc.

Kohlert, et al., The Java API for XML-Based Web Services (JAX-WS) 2.1, May 7, 2007, Sun Microsystems, INc.

Pandey, Web Services for Java EE, Version 1.2, May 8, 2006, Sun Microsystems, Inc.

* cited by examiner

| IDENTIFICATION INFORMATION OF PROCESSING | IDENTIFICATION INFORMATION OF GROUP | NUMBER OF EXECUTIONS | TOTAL REQUIRED TIME |
|---|---|---|---|
| 1025 | 302 | 51 | 2023s |
| 1026 | 302 | 22 | 1683s |
| 1027 | 302 | 155 | 4332s |
| . | . | . | . |
| . | . | . | . |
| . | . | . | . |
| 1025 | 304 | 48 | 1023s |
| 1026 | 304 | 18 | 530s |
| 1027 | 304 | 15 | 482s |
| . | . | . | . |
| . | . | . | . |
| . | . | . | . |

FIG. 5

TECHNIQUE FOR PREVIOUSLY PROVIDING ESTIMATE OF TIME REQUIRED FOR PROCESSING

CROSS-REFERENCE TO RELATED APPLICATIONS

This application is a continuation of U.S. patent application Ser. No. 12/342,139, filed on Dec. 23, 2008 and entitled "Technique For Previously Providing Estimate of Time Required For Processing," which claims priority to previously filed Japanese Application No. JP2007-334693, filed on Dec. 26, 2007, the entirety of both of which are hereby incorporated by reference.

BACKGROUND

The present invention relates to a technique with which a client device communicates with a server device. In particular, the present invention relates to a technique with which a client device issues a request to a server device.

The recent widespread use of J2EE (Java 2 Enterprise Edition), for example, has being widely promoting the use of web application systems (refer to "Description for Java EE & Web service, URL: http://sdc.sun.co.jp/java/j2ee/index.html in the Internet, searched on 28 Nov. 2007"). Most of web application systems are designed to simultaneously process multiple requests issued by a large number of client devices. However, when there are too many requests to be processed at the same time, the processing of such many requests takes an excessively long time. This situation forces each of users of client devices to wait for a long time and reduces the convenience for the users on some occasions.

Under these circumstances, various techniques with which a large number of requests can be efficiently processed have been used to develop systems to deal with the above problems. One example of such techniques is a technique of temporarily storing received requests in a queue type of data area. When a completion of other processing or another similar event reduces the processing load placed on the server computer, a web-application system obtains the next request from the data area and processes the request. Under such control, the load on the server computer is kept at an appropriate level to reduce a time required for processing.

Meanwhile, some of received requests are not very important to the users. In this case, if the waiting time until the completion of processing such an unimportant request is too long, a user may not want to transmit the request from the beginning. Since the foregoing technique is based on a premise that all requests already received must be processed, such unnecessary requests are to be processed together with other more important requests.

Being based on the premise that all request already received must be processed as described above, the conventional technique is not capable of preventing a user from transmitting a less necessary request from the beginning. For example, a user cannot determine whether to transmit a request because the user cannot know in advance how much load will be placed on a server device by the request to be transmitted, or how much load is currently placed on the server device.

SUMMARY

Against this background, an object of the present invention is to provide a client device, a server device, a method and a program which are capable of solving the foregoing problems. This object is achieved by combinations of features described in the independent claims in the scope of claims. Moreover, more advantageous specific applications of the present invention are defined in the dependent claims.

To solve the foregoing problems, a first aspect of the present invention provides a client device communicating with a server device, the client device including: a display section for displaying a page including at least one display object on a screen; a transmitting section for transmitting a processing request to the server device in response to an event where the display object receives an operation by a user; an obtaining section for obtaining, before the operation by the user, an estimate of time required for processing that will be executed by the server device in response to the processing request; and an output section for outputting the obtained estimate of required time in association with the display object. Moreover, a method and a program causing a computer to function as the client device are also provided.

Additionally, a second aspect of the present invention provides a server device communicating with a client device, the server device including: a storage device; a measuring section that measures a time required for processing requested by the client device, and then stores the time required for the processing in the storage device in association with identification information of the processing; and a reply section that, in response to an event where a request to return an estimate of time required for processing is received from the client device, reads from the storage device the required time associated with the identification information of the processing, and returns information based on the read required time, to the client device. Moreover, a method and a program causing a computer to function as the server device are also provided.

It should be noted that the foregoing outline of the present invention dose not list all the features necessary for the present invention, and that subcombinations of these features can also be included in the present invention.

BRIEF DESCRIPTION OF THE SEVERAL VIEWS OF THE DRAWINGS

For a more complete understanding of the present invention and the advantage thereof, reference is now made to the following description taken in conjunction with the accompanying drawings.

FIG. 5 shows a specific example of a data structure in a storage device 104 according to this embodiment.

DETAILED DESCRIPTION

Hereinafter, the present invention will be described by use of an embodiment of the present invention. The following embodiment, however, does not limit the invention according to the scope of claims, or all the combinations of features described in the embodiment are not necessarily essential for solving means of the present invention.

Figure 1:
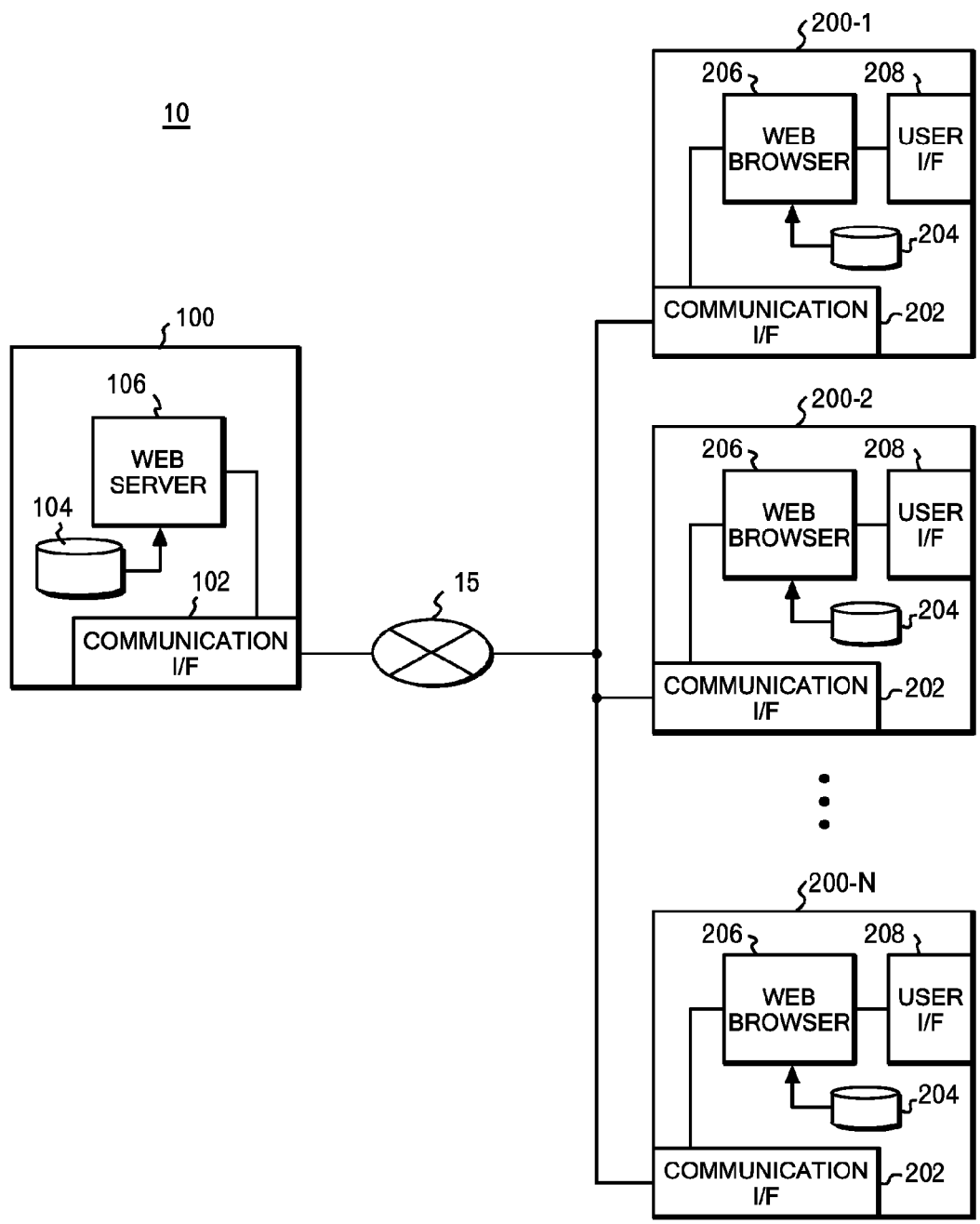
FIG. 1 shows a whole configuration of an information system 10 according to a present embodiment.

FIG. 1 shows a whole configuration of an information system 10 according to this embodiment. The information system 10 includes a server device 100 and multiple client devices 200 (for example, client devices 200-1 to N). The server device 100 includes as basic hardware a communication interface 102 such as a network interface card, for example, and a storage device 104 such as a hard disk drive, for example. The server device 100 functions as a web server 106 by reading a program from the storage device 104 and executing the read program with a CPU.

The client device 200-1 includes as basic hardware a communication interface 202 such as a network interface card, for example, a storage device 204 such as a hard disk drive, for example and a user interface 208 such as a display device and an input device, for example. The client device 200-1 functions as a web browser 206 by reading a program from the storage device 204 and executing the read program by a CPU. Incidentally, since the client devices 200-2 to N are almost the same as the client device 200-1, the description of the client devices 200-2 to N will be omitted here except for the different point from the client device 200-1.

The server device 100 is connected to all the client devices 200-1 to N through a communication network 15. The communication network 15 may be a public communication line such as the Internet, for example, or a private communication line such as an enterprise network, for example. Through the communication network 15, the web server 106 communicates with the web browser 206 that operates in each of the client devices 200-1 to N. Specifically, the web browser 206 transmits a processing request to the web server 106. The web server 106 executes the processing corresponding to the request, and returns the execution result as a response to the web browser 206.

When the web server 106 receives multiple requests from a large number of web browsers 206 at one time, a time required to process these requests by the web server 106 is too long in some cases. To avoid this situation, the information system 10 according to this embodiment informs users of the client devices 200-1 to N of an estimate of time required for processing in advance in order to demotivate the users to transmit the requests.

Figure 2:
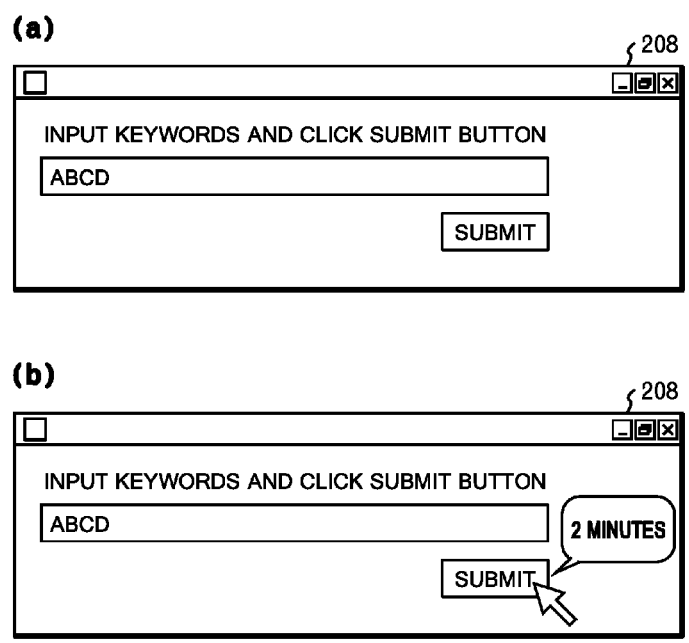
FIGS. 2A and 2B each show an example of a screen displayed by a user interface 208 according to this embodiment.

FIGS. 2A and 2B show one example of a screen displayed by the user interface 208 according to this embodiment. FIG. 2A shows one example of a certain web page. This web page includes a character string of "INPUT KEYWORDS AND CLICK SUBMIT BUTTON," an input field for keywords, and the submit button. In the example shown in FIG. 2A, a keyword "ABCD" is already inputted in the input field. In this state, when the submit button is clicked with an input device such as a mouse, the keyword "ABCD" included in a request is transmitted from the client device 200-1 to the server device 100. In response to this, the web server 106 starts the processing.

FIG. 2B shows that the focus of a cursor of the mouse or the like is on the submit button on that web page. Once the focus is positioned on the submit button, the web browser 206 displays an estimate of time required for processing that will be executed by the web server 106 in response to a click of the submit button. In FIG. 2B, a symbol indicating an estimate of required time, i.e., a numeric value indicating the time is displayed in a tooltip, for example.

In this way, by positioning the focus on the submit button without actually clicking the submit button, the user can previously know a time which will be required for processing if the submit button is clicked. Accordingly, if a time required for unimportant processing is too long, for example, the user is expected not to transmit the request itself at user option. As a result, the web server 106 can efficiently execute only really necessary processing. Hereinafter, a configuration for implementing this function will be described.

Figure 3:
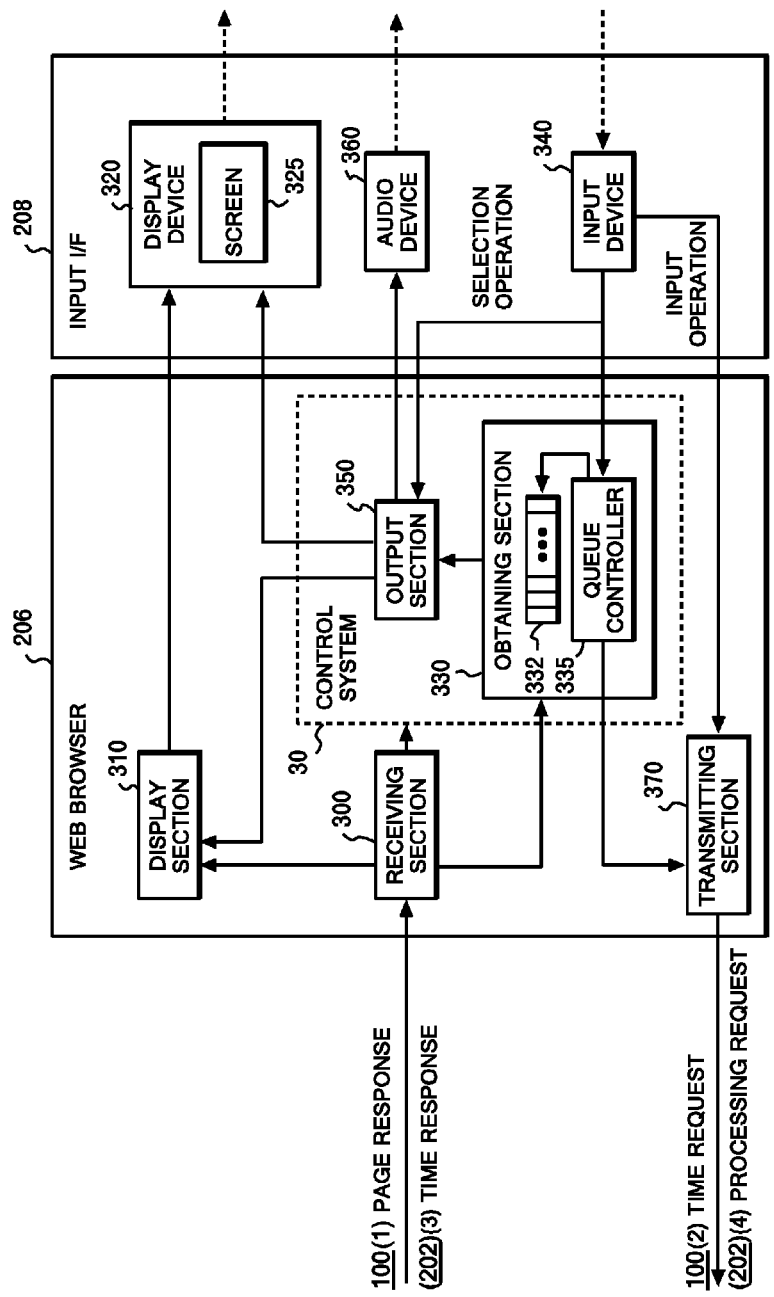
FIG. 3 shows functional configurations of a web browser 206 and the user interface 208 according to this embodiment.

FIG. 3 shows functional configurations of the web browser 206 and the user interface 208 according to this embodiment. The web browser 206 includes a receiving section 300, a display section 310 and a transmitting section 370. From the server device 100, the receiving section 300 receives a file for showing a page to be displayed on the display section 310. For instance, this file is transmitted from the server device 100 as a response to a request already transmitted by the transmitting section 370 (1).

More specifically, this file shows at least one display object to be displayed in the page. The display object may be not only a character string or an image, for example, but also a button, a hyper link or a pull-down menu for receiving an operation by a user. This display object receives a selection operation by the user, and also receives an input operation while receiving the selection operation.

The selection operation is an operation of overlaying the cursor of a pointing device with the display object to position its cursor focus on the display object, for example. Instead of this, the selection operation may be an operation of positioning a cursor on the display object by use of direction keys and a tab key of a keyboard. On the other hand, the input operation is an operation of clicking the display object by use of the pointing device. Instead of this, the input operation may be an operation of pressing an enter key of the keyboard.

These display objects may be defined by use of a page description language such as hypertext mark-up language (HTML) and a program language such as JavaScript, for example. In addition, some display objects may be merely used to show symbols without having a function of receiving an operation by the user.

The display section 310 displays a page according to a received file on a screen 325 of a display device 320, the page including at least one display object. The web browser 206 functions as a control system 30 by executing a program in the file. The control system 30 includes an obtaining section 330 and an output section 350. Before the user performs an input operation, the obtaining section 330 obtains in advance an estimate of time required for processing that the server device 100 will execute in response to a processing request transmitted by the transmitting section 370.

For instance, the obtaining section 330 may obtain an estimate of required time from the server device 100 with the estimate of required time included in a file received by the receiving section 300. Otherwise, the obtaining section 330 may instruct the transmitting section 370 to transmit a request to the server device 100, the request causing the server device 100 to transmit an estimate of required time to the client device 200-1 (2). Meanwhile, the receiving section 300 receives the estimate of required time from the server device 100 (3). The obtaining section 330 thus obtains the estimate of required time and outputs the estimate to the output section 350.

An estimate calculated in advance by the server device 100 may be generated as the estimate of required time. For example, the estimate of required time may be a statistical quantity calculated based on a history of required times that have been measured for the processing already executed by the server device 100. For example, the estimate of required time may be a mean value of the times required for the processing already executed, or any one of the median value and the maximum value of the times required for the processing for a certain period of time. Preferably, the estimate of required time may be calculated based on the previously-measured times required for the same type of processing as that corresponding to a request to be newly transmitted.

In response to an event where the display object on the screen receives a selection operation by the user, the output section 350 outputs the estimate of required time obtained in association with the display object. For example, the output section 350 may output a sound representing the estimate of required time from an audio device 360. In this case, the sound may be outputted, for example, with its pitch, loudness or tone changed according to the length of the required time. Alternatively, the output section 350 may display a symbol on the screen 325 in association with the display object on the screen, the symbol representing the estimate of required time obtained for the display object.

Note that the estimate of required time is not necessarily limited to numerical value information directly indicating the required time itself. For example, the estimate of required time may be information indicating whether the required time is shorter or longer than a certain reference value. Instead, the estimate of required time may be a numerical value indicating how much processing load is to be placed on the server device 100. Since larger processing load generally results in a longer required time, the amount of processing load also indicates the estimate of required time.

In addition, as another example, the output section 350 may cause the screen 325 to output the estimate of required time by displaying the display object with its color or shape changed so as to make the estimate of required time recognizable. For example, a display object needing a long required time may be colored in a remarkable color such as red. Otherwise, the screen 325 may display a display object needing a long required time with a border attached therearound. The changing of the shape includes changing the size. For example, the screen 325 may display a display object needing a short required time more largely than other display objects.

The transmitting section 370 transmits a processing request to the server device 100 in response to an event where the display object receives an input operation by the user (4). In response to this, the web browser 206 in the client device 200 starts processing. It is expected that the web browser 206 requires a time approximately equal to the estimate of required time informed in advance before completing the processing.

Here, in order to increase the accuracy in the estimation, it is preferable to change the estimate of required time according to changes in the conditions of the serer device 100. If the obtaining section 330 regularly issues the request for the estimate of required time, for instance, the estimate of required time can be changed following changes in the conditions of the server device 100. Instead, if the obtaining section 330 obtains the estimate of required time only for a display object receiving a selection operation and only when the display object receives it, the obtaining section 330 can obtain the estimate of required time under the latest conditions.

On the other hand, if the obtaining section 330 is designed to request the required times for all the display objects receiving the selection operations, a load on the communication network 15 is increased more than necessary. This is because the obtaining section 330 issues a large number of requests when the user repeatedly performs the selection operation. To avoid this situation, the obtaining section 330 may transmit a request for only some predetermined display objects from among all the display objects on a web page only when the display objects receives the selection operations.

As another example to avoid the excessive transmission of requests, the obtaining section 330 may include a queue 332 and a queue controller 335. More precisely, the queue 332 is a first-in first-out queue, and sequentially stores requests to transmit the estimate of required time every time any display object receives a selection operation. Then, the queue controller 335 sequentially fetches the requests from the queue 332 and transmits the requests to the server device 100, for example, on a regular basis regardless of the timing at which the display object receives the selection operation. This prevents the excessive transmission of requests, which might occur when the selection operation is received too frequently at one time.

Figure 4:
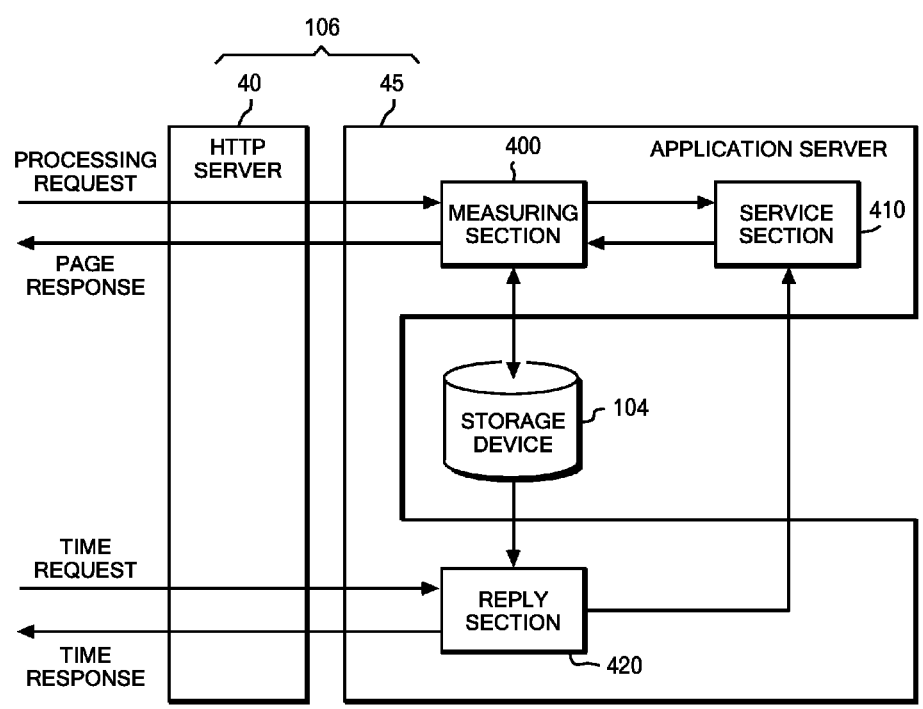
FIG. 4 shows a functional configuration of a web server 106 according to this embodiment.

FIG. 4 shows a functional configuration of the web server 106 according to this embodiment. The web server 106 includes an HTTP server 40 and an application server 45. From each of the client devices 200-1 to N, the HTTP server 40 receives a request in conformity to hypertext transfer protocol (HTTP), for example. In addition, the HTTP server 40 returns as a response a processing result corresponding to a received request, to each of the client devices 200-1 to N.

The application server 45 includes a measuring section 400, a service section 410 and a reply section 420. The measuring section 400 receives a processing request from each of the client devices 200-1 to N. The description here is provided on the assumption that the measuring section 400 receives a processing request from the client device 200-1, for example. Thereafter, the service section 410 executes the processing corresponding to the request. An application program to process, for example, web services and the like, and more specifically, a program developed based on J2EE can be cited as specific examples of the service section 410. The processing result is included in a response as data of, for example, an HTML page or the like, and is thus returned to the client device 200-1.

The measuring section 400 measures a time required for the requested processing, and stores the time required for the processing in the storage device 104 in association with the identification information of the processing. The required time may be calculated by use of a method that is automatically called by a function of a virtual machine, such as a servlet filter, at a start time and/or end time of processing. One possible example of this calculation is to calculate the time required for the processing by subtracting the start time of the processing from the end time thereof.

Then, the measuring section 400 may store the time required for the processing in the storage device 104 in association with the identification information of a group to which the processing belongs to. FIG. 5 shows one example of this storage.

FIG. 5 shows the specific example of a data structure in the storage device 104 according to this embodiment. The storage device 104 stores the identification information of processing in association with the identification information of a group to which the processing belongs to, a history of the number of executions of the processing, and the total of the times required for the processing. Every time the processing is newly completed, the measuring section 400 increments the number of executions of the processing in a record corresponding to the identification information of the processing and the identification information of the group to which the processing belongs. Moreover, the measuring section 400 adds the currently-measured time required for the processing newly executed, to the total required time in the record.

Here, a group to which a certain type of processing belongs to can be determined, for example, according to the characteristics of the type of processing. The characteristics of the type of processing indicate whether the type of processing needs to intensively use the processing capacity of the CPU, whether the type of processing needs to intensively and mainly use a file input-output function, or the like. Instead of such grouping, a group to which a certain type of processing belongs to can be determined, for example, according to the performance of the client device 200 that requests the processing. This is because, even when the server device 100 is kept in the same conditions, a difference in the performance among the client devices 200 sometimes results in variations in the user's waiting time before the completion of the same processing. In this case, if the types of processing are classified into groups according to the required times depending on the performance of the client devices 200, the accuracy of the required time is further improved.

Another example of the grouping is to classify several types of processing into a group based on the users who request the processing. As a more specific example, the group identification information "304" indicates a group of users who are to be preferentially served on the condition of paying a higher usage fee. On the other hand, the group identification information "302" indicates a group of users who are not to be preferentially served. By use of a function of the service section 410, the execution priority of processing requested by a user can be determined as one of different ranks according to which group the user belongs to. In this case, the time required for the processing may largely vary depending on which group the user belongs to. To deal with this situation, the storage device 104 may store a history of the required times for each group of the users who require the processing. In this case, the reply section 420 may search the storage device 104 to find a record corresponding to a set of the identification information of the group to which the user belongs to, and the identification information of the requested processing, and then may calculate the estimate of required time based on the found record.

Here, the description is returned to FIG. 4. From each of the client devices 200-1 to N, the reply section 420 receives a request to return the estimate of time required for processing. Here, the description is provided on the assumption that the reply section 420 receives the request from the client device 200-1. In response to receiving the request, the reply section 420 reads, from the storage device 104, the required time corresponding to the identification information of the processing, and returns information based on the read required time, as a response to the request, to the client device 200-1. The information based on the read required time may be a mean value of the required times, for example, as described above.

Incidentally, the reply section 420 may instruct the service section 410 to include the estimate of required time in a web page and thus to return the estimate. In response to this instruction, the service section 410 can return a response indicating the processing result and the like and including the estimate of time required for the processing.

Moreover, the reply section 420 may periodically delete the required times stored in the storage device 104 in order to cause the estimate of required time to always and responsively follow a change in the conditions of the server device 100. In addition, the storage device 104 may store each record in association with its last update time and the reply section 420 may delete the record from the storage device 104 if the period of time from the last update time to the present time is longer than a certain period of time.

As described above with reference to FIGS. 4 and 5, the web server 106 sequentially updates the information of the times required for the processing for each display object, and thereby returns the information of the latest required time immediately after the receipt of a request to return the required time. This allows each of the users of the client devices 200-1 to N to accurately know the current conditions of the server device 100 and to appropriately determine whether or not to transmit a request.

Figure 6:
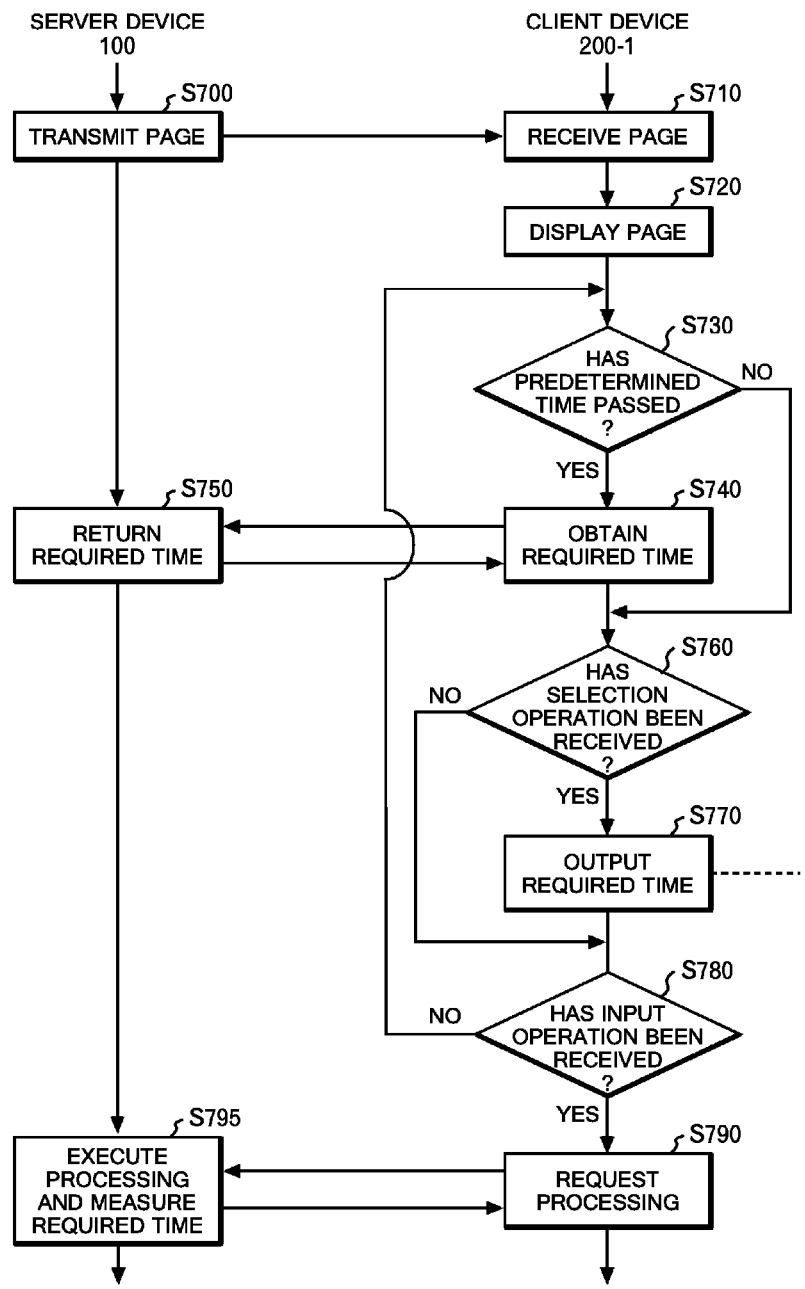
FIG. 6 shows a first example of the processing flow of a server device 100 and a client device 200 according to this embodiment.

FIG. 6 shows a first example of the processing flow of the server device 100 and the client device 200 according to this embodiment. In this first example, the client device 200 periodically receives the time required for the processing for each display object from the server device 100, and outputs the estimate of time in response to an event where the display object receives the selection operation.

Specifically, in response to an already-received request, the reply section 420 transmits to the client device 200-1 a file including data, for example, a web page and the like ($S_{700}$). In this file, the estimate of time required for processing may be stored in association with each display object.

The receiving section 300 receives the file including data on the web page and the like from the server device 100 (S710). The display section 310 displays the web page on the screen 325 according to the file (S720). The obtaining section 330 determines whether a predetermined period of time has already passed since the page was displayed or since the obtaining section made the same kind of determination lastly (S730).

If the predetermined period of time has already passed (S730:YES), the obtaining section 330 obtains from the server device 100 the estimate of time required for processing that will be executed for each of predetermined display objects on the screen in response to an event where the predetermined display object receives an input operation (S740). To be more precise, the obtaining section 330 may transmit to the server device 100 a request to return an estimate of required time. Upon receipt of this, the reply section 420 may read the estimate of required time from the storage device 104 and returns the estimate of required time to the obtaining section 330 (S750).

Next, the output section 350 determines whether any of the display objects on the screen has received the user's selection operation (S760). If one of the display objects has received the selection operation (S760: YES), the output section 350 outputs the estimate of required time which is obtained in association with the display object (S770).

Here, it is preferable to output the estimate of required time with a certain period of delay time after a reception of the selection operation in order that highly-frequent output of the estimate of required time may not obstruct a user's operation. For example, on condition that a predetermined duration has passed while the display object keeps receiving the selection operation by the user after the reception thereof, the output section 350 may output the obtained estimate of time required.

Next, the transmitting section 370 determines whether the display object has received an input operation by the user (S780). If the display object has not received the input operation (S780: NO), the client device 200-1 returns the processing to S730 and determines whether the predetermined period of time has passed. On the other hand, if the display object has received the input operation (S780: YES), the client device 200-1 transmits a processing request to the server device 100 (S790).

In response to receiving this, the web server 106 starts processing in the server device 100 (S795). Then, in the server device 100, the measuring section 400 measures the time required for the processing. Eventually, the processing returns to S700, and the server device 100 transmits the next page to the client device 200-1.

According to the first example described above, the estimate of required time is obtained not for every selection operation but at certain time intervals. Thus, even when the selection operation is received at high frequency, the communications traffic between the server device 100 and the client device 200-1 can be kept constant.

Figure 7:
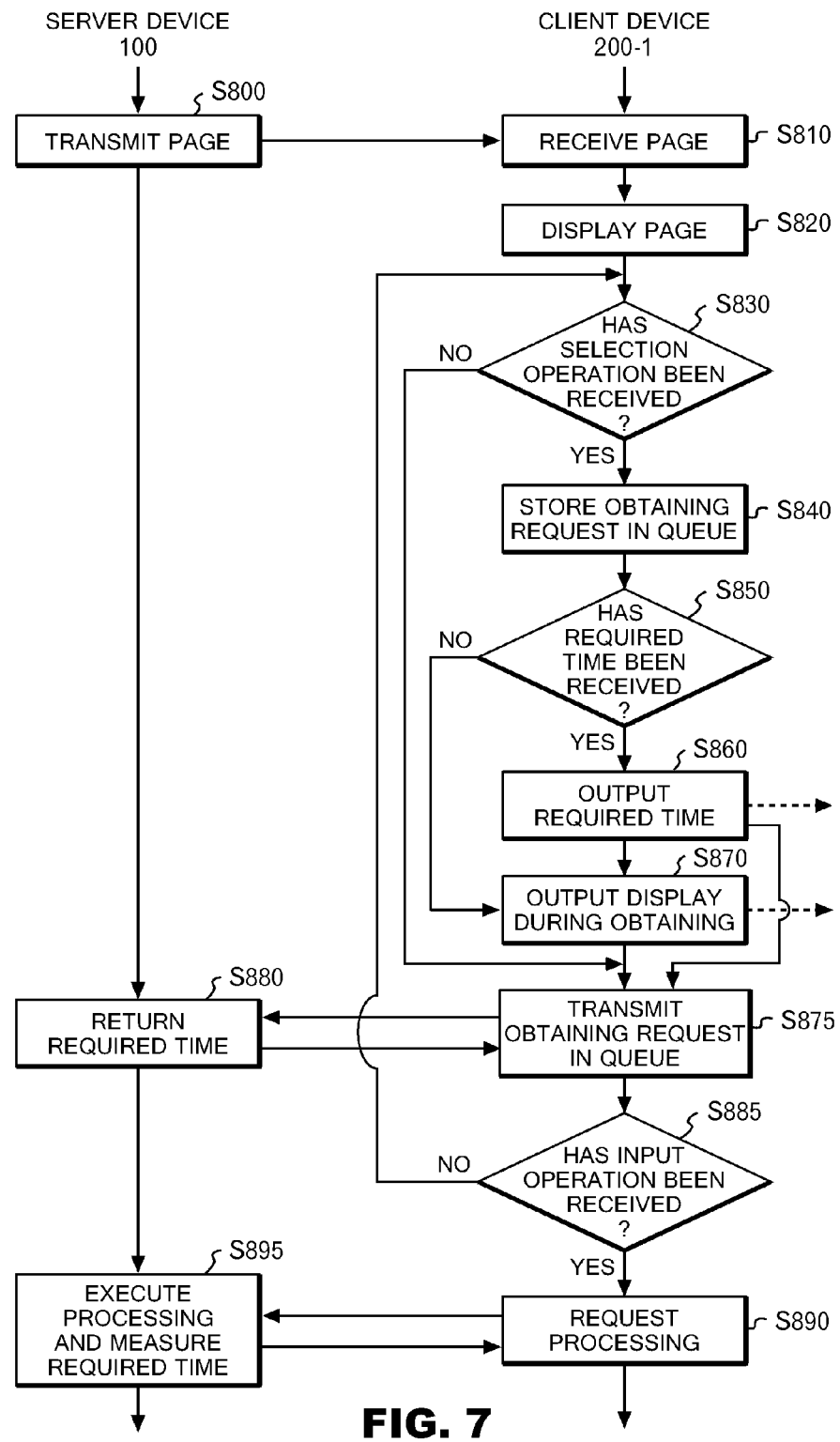
FIG. 7 shows a second example of the processing flow of the server device 100 and the client device 200 according to this embodiment.

FIG. 7 shows a second example of the processing flow of the server device 100 and the client device 200 according to this embodiment. In this second example, instead of equally obtaining the required times for all of certain display objects, the estimate of required time is obtained only for a display object having received the selection operation and only when the display object receives the selection operation.

Specifically, the reply section 420 transmits a file including data of a web page and the like in response to an already-received request (S800). From the server device 100, the receiving section 300 receives the file including the data of the web page and the like (S810). The display section 310 displays the web page on the screen 325 according to the file (S820).

Thereafter, the obtaining section 330 determines whether any one of the display objects on the screen has received the selection operation by the user (S830). If one of the display objects has received the selection operation (S830: YES), the queue 332 stores a request corresponding to the display object having received the selection operation (S840). This request is a request to return the estimate of time required for processing that will be executed in response to an event where the display object receives the input operation. The stored request is processed asynchronously with the selection operation, for example, in S875 which will be described later.

After that, the output section 350 determines whether or not the estimate of required time has already been received as response to this request (S850). If the estimate of required time has already been received (S850: YES), the output section 350 outputs the estimate of required time (S860). Here, in order to prevent the output of outdated information, the output section 350 preferably outputs the obtained estimate of time required only when a predetermined reference period of time has not yet passed since the obtaining section 330 obtained the estimate of required time. By contrast, if the predetermined reference period of time has already passed, the output section 350 does not output the estimate of required time.

On the other hand, if the estimate of required time has not been obtained, that is, during a time from when the obtaining section 330 starts processing for obtaining the estimate of required time from the server device 100 till when the obtaining section 330 completes the processing, the output section 350 outputs display indicating that the obtaining section 330 is in the process of obtaining the estimate of required time (S870).

Thereafter, regardless of the timings of receiving the selection operations, i.e., for example, on a regular basis, the queue controller 335 sequentially fetches the requests from the queue 332 and transmits the requests to the server 100 (S875). A desirable order of taking the requests is the reverse order (LIFO: Last In First Out) that is the reverse of the order of storing requests in the queue 332. However, this order can be changed in order to preferentially obtain more useful information.

For example, in the case where the estimate of required time already obtained for a certain first display object is longer than that for a certain second display object, the queue controller 335 may fetch from the queue 332 the request to return the estimate of required time for the first display object prior to the request for the second display object. In order to implement this, the queue 332 may store, in association with each kind of the requests, the required time that has been last returned in response to the kind of request. Under such control of request ordering, an estimate of required time can be more frequently updated when the estimate of required time is so long that a user waits for the estimate of required time to become short while paying attention to the estimate of required time.

Next, the transmitting section 370 determines whether the display object has received the input operation by the user (S885). If the display object has not received the input operation (S885: NO), the client device 200-1 returns the processing to S830, and determines whether the display object has received the selection operation. If the display object has received the input operation (S885: YES), the transmitting section 370 transmits a processing request to the server device 100 (S890).

Upon receipt of this, the web server 106 starts processing in the server device 100 (S895). Then, in the server device 100, the measuring section 400 measures the time required for the processing. Eventually, the processing returns to S800, and the server device 100 transmits the next page to the client device 200-1.

According to the second example described above, the estimate of required time is obtained only for the display object having received the selection operation. Thus, the communications traffic between the server device 100 and the client device 200-1 can be reduced. Moreover, the use of the queue 332 prevents highly-frequent transmission of the requests, which will be otherwise performed if the selection operations are received frequently.

Figure 8:
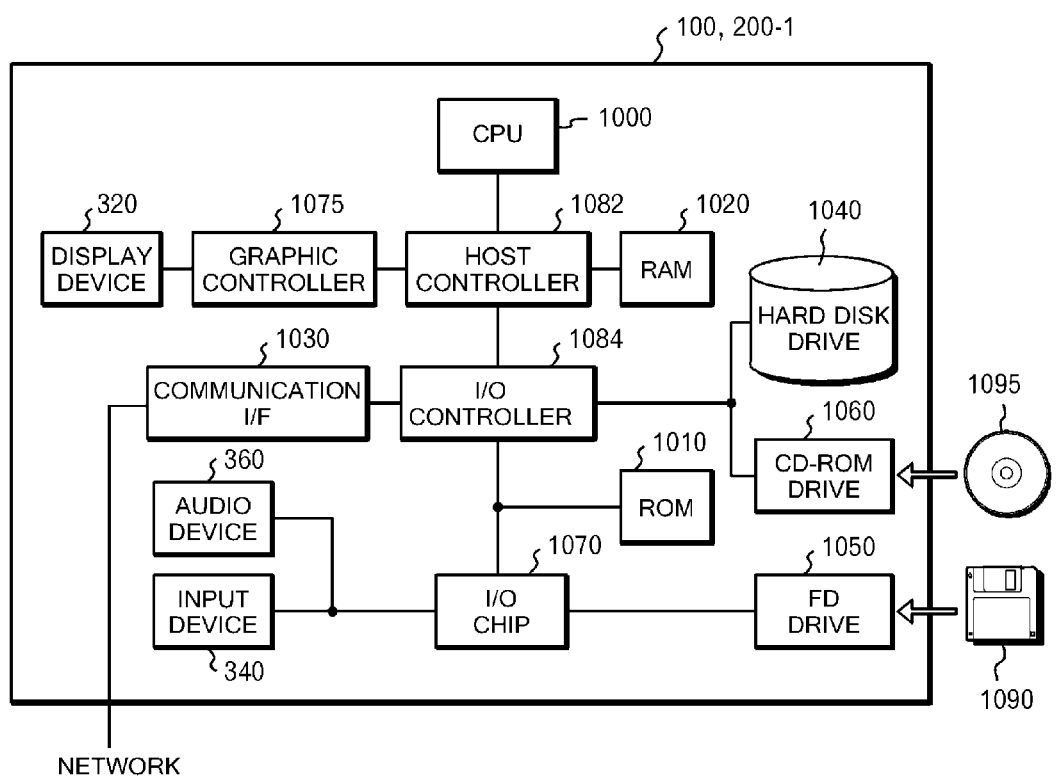
FIG. 8 shows one example of a hardware configuration of a computer functioning as any one of the server device 100 and the client device 200 according to this embodiment.

FIG. 8 shows one example of a hardware configuration of a computer functioning as any one of the server device 100 and the client device 200-1 according to this embodiment. The computer includes a CPU peripheral unit, an input/output unit and a legacy input/output unit. The CPU peripheral unit includes a CPU 1000, a RAM 1020 and a graphics controller 1075, all of which are mutually connected to one another via a host controller 1082. The input/output unit includes a communication interface 1030, a hard disk drive 1040 and a CD-ROM drive 1060, all of which are connected to the host controller 1082 via an input/output controller 1084. The legacy input/output unit includes a ROM 1010, a flexible disk drive 1050 and an input/output chip 1070, all of which are connected to the input/output controller 1084.

The host controller 1082 connects the RAM 1020 to the CPU 1000 and the graphics controller 1075, each of which accesses the RAM 1020 at a high transfer rate. The CPU 1000 operates in accordance with programs stored in the ROM 1010 and in the RAM 1020, and controls each of the components. The graphics controller 1075 obtains image data that the CPU 1000 or the like generates in a frame buffer provided in the RAM 1020, and causes the obtained image data to be displayed on a display device 320. Instead of this, the graphics controller 1075 may internally include a frame buffer in which the image data generated by the CPU 1000 or the like is stored.

The input/output controller 1084 connects the host controller 1082 to the communication interface 1030, the hard disk drive 1040 and the CD-ROM drive 1060, all of which are relatively high-speed input/output devices. The communication interface 1030 is one example of the communication interface 102, the communication interface 202, or the like, and communicates with an external device via a network. The hard disk drive 1040 is one example of the storage device 104, the storage device 204 or the like, and stores programs and data used by the computer. The CD-ROM drive 1060 reads a program or data from a CD-ROM 1095, and provides the read-out program or data to the RAM 1020 or the hard disk 1040.

Moreover, the input/output controller 1084 is connected to relatively low-speed input/output devices such as the ROM 1010, the flexible disk drive 1050 and the input/output chip 1070. The ROM 1010 stores programs such as a boot program executed by the CPU 1000 at a start-up time of the computer and a program depending on the hardware of the computer. The flexible disk drive 1050 reads a program or data from a flexible disk 1090, and provides the read-out program or data to the RAM 1020 or the hard disk drive 1040, via the input/output chip 1070. The input/output chip 1070 causes, for example, the audio device 360 to output a sound. The input/output chip 1070 is connected to the flexible disk drive 1050 and various kinds of input/output devices, for example, through a parallel port, a serial port, a keyboard port, a mouse port and the like.

A program stored in a storage medium such as the flexible disk 1090, the CD-ROM 1095 or an IC card is provided to the computer by a user. The program is read from the storage medium via the input/output chip 1070 and/or the input/output controller 1084, and is installed and executed on the computer. Operations that the program causes the computer or the like to execute are identical to the operations of the server device 100 or the client device 200-1 described by referring to FIGS. 1 to 7. Accordingly, the description thereof is omitted here.

The program described above may be stored in an external storage medium. In addition to the flexible disk 1090 and the CD-ROM 1095, any one of the following media may be used as the storage medium: an optical storing medium such as a DVD and a PD; a magneto-optic storing medium such as an MD; a tape medium; and a semiconductor memory such as an IC card. Alternatively, the program may be provided to the computer via a network, by using, as a storage medium, a storage device such as a hard disk and a RAM, provided in a server system connected to a private communication network or to the Internet.

Since the information system 10 according to this embodiment described above lets the user of the client device 200 know the time required for the processing in advance, the user can determine not to transmit an unnecessary request of low importance in some cases, or can determine to postpone transmitting a request when the server device 100 is under too heavy processing load. This prevents beforehand a vicious circle that may occur at times of heavy load, such as one in which, for example, a response is so late that a user is impatient to wait and thus transmits the same request many times. As a result, the information system 10 can cause the server device 100 to efficiently operate. In addition, the technique according to this embodiment can be used not only as a replacement for the conventional technique for causing the server device 100 to efficiently execute the processing for multiple requests, but also in combination with such conventional technique.

Hereinabove, the present invention has been described by use of the embodiment. However, the technical scope of the present invention is not limited to the extent described in the aforementioned embodiment. It is obvious to those skilled in the art that various modifications and improvements can be additionally provided to the above embodiment. For example, the estimate of required time can be displayed on a screen different from the screen on which a web page is displayed. An example of this is a screen, such as a heat map, for example, on which color panels respectively representing estimates of required times are arranged in the order of displaying their corresponding display objects. From the description of the scope of claims, it is apparent that the technical scope of the present invention should include embodiments with such modifications or improvements.

What is claimed is:

1. A client device communicating with a server device, the client device comprising:
    a transmitter adapted to transmit a processing request to the server device in response to an event where at least one display object receives an input operation by a user; and
    a processor executing instructions stored on a memory, the memory comprising:
        a display section adapted to display a page including the at least one display object on a screen, wherein the at least one display object receives a selection operation by the user, and further receives the input operation by the user;
        an obtaining section adapted to obtain from the server device, before either the selection operation or the input operation by the user, an estimate of time required for processing that will be executed by the server device in response to the processing request, wherein the obtaining section transmits a return request to the server device, the return request causing the server device to return the estimate of required time for processing to the client device, and further wherein the obtaining section is adapted to determine, prior to receiving the selection operation by the user, an elapsed amount of time following obtaining of the estimate of time required for processing, the obtaining section adapted to obtain an updated estimate of time required for processing when said elapsed amount of time exceeds a predetermined amount of time, and further wherein the obtained estimate of the required time is not displayed to the user until the at least one display object on the screen receives the selection operation by the user; and
        an output section adapted to output the obtained estimate of required time in association with the at least one display object, wherein the output section outputs the obtained estimate of the required time in response to the event where the at least one display object on the screen receives the selection operation by the user.

2. The client device according to claim 1, wherein the obtaining section obtains, from the server device, information based on a history of required times that have been measured for processing already executed by the server device, as the estimate of time required for the processing that will be executed in response to the processing request to be newly transmitted.

3. The client device according to claim 1, wherein the obtaining section obtains the estimate of required time from the server device while the estimate is included in a file for showing a page to be displayed on the display section.

4. The client device according to claim 3, wherein the obtaining section regularly obtains the estimate of required time from the server device, and updates the previously-obtained estimate of required time to the newly-obtained estimate of required time.

5. The client device according to claim 1, wherein the obtaining section obtains the estimate of the required time from the server device in response to an event where the display object receives the selection operation by the user.

6. The client device according to claim 5, wherein the obtaining section comprises:
   a first-in last-out queue for sequentially storing the return requests every time any one of display objects receives the selection operation; and
   a queue controller for fetching the return requests from the queue and transmitting the return requests to the server device sequentially.

7. The client device according to claim 6, wherein when the estimate of the required time, obtained for a certain display object, is longer than that for a different display object, the queue controller fetches the return request for the certain display object prior to a return request for the different display object.

8. The client device according to claim 1, wherein in association with a display object included in the page, the output section causes the display section to display a symbol representing the estimate of required time that is obtained for the display object.

9. The client device according to claim 1, wherein the output section outputs the estimate of required time that is obtained for a display object included in the page, by displaying the display object on the screen with a color of the display object changed so as to make the estimate of required time recognizable.

10. The client device according to claim 1, wherein the output section outputs the estimate of required time that is obtained for a display object included in the page, by displaying the display object on the screen with a shape of the display object changed so as to make the estimate of required time recognizable.

11. The client device according to claim 1, wherein in response to an event where a display object included in the page receives the selection operation by the user, the output section outputs a sound representing the estimate of required time that is obtained for the display object.

12. The client device according to claim 1, wherein the output section outputs the obtained estimate of required time if a predetermined reference time period has not passed yet since the obtaining section obtained the estimate, and does not output the estimate of required time if the predetermined reference time period has passed since the obtaining section obtained the estimate.

13. The client device according to claim 1, wherein the output section provides an output indicating that the obtaining section is in the process of obtaining the estimate of required time, during a time from when the obtaining section starts processing for obtaining the estimate of required time from the server device till when the obtaining section completes the processing.

14. The client device according to claim 1, wherein on condition that the display object keeps receiving the selection operation by the user for a predetermined time period after receiving the selection operation, the output section outputs the obtained estimate of required time.

15. A non-transitory computer-readable storage medium containing program code comprising:
   program code for transmitting a processing request to a server device in response to an event where at least one display object receives an input operation by a user;
   program code for displaying on a screen of a client device the at least one display object, wherein the at least one display object receives a selection operation by the user, and further receives the input operation by the user;
   program code for obtaining from a server device, before either the selection operation or the input operation by the user, an estimate of time required for processing that will be executed by the server device in response to the processing request, wherein the client device transmits a return request to the server device, the return request causing the server device to return the estimate of required time for processing to the client device, and further wherein the client device determines, prior to receiving the selection operation by the user, an elapsed amount of time following obtaining of the estimate of time required for processing, the client device obtaining an updated estimate of time required for processing when said elapsed amount of time exceeds a predetermined amount of time, and further wherein the obtained estimate of the required time is not displayed to the user until the display object on the screen receives the selection operation by the user; and
   program code for outputting the obtained estimate of required time in association with the display object, wherein the client device outputs the obtained estimate of the required time in response to the event where the display object receives the selection operation by the user.

16. The non-transitory computer-readable storage medium of claim 15, further comprising program code for obtaining, from the server device, information based on a history of required times that have been measured for processing already executed by the server device, as the estimate of time required for the processing that will be executed in response to the processing request to be newly transmitted.

17. The non-transitory computer-readable storage medium of claim 15, further comprising program code for fetching at least one return request from a first-in last-out queue in which a plurality of return requests are sequentially stored.

18. The non-transitory computer-readable storage medium of claim 15, wherein when the estimate of required time obtained for a certain display object is longer than that for a different display object, a queue controller fetches a return request for the certain display object prior to a return request for the different display object.

19. A server device communicating with a client device, the server device comprising:
   a receiving section adapted to receive a processing request from the client device in response to an event where at least one display object on the client device receives an input operation by a user, further wherein said receiving section is adapted to receive a return request from the client device, and further wherein said receiving section is adapted to receive an additional return request from the client device; and
   a processor executing instructions stored on a memory, the memory comprising:
      an estimating section adapted to estimate time required for processing that will be executed by the server device in response to receiving the processing request from the client device, and further adapted to obtain an updated estimate of time required for processing in response to the additional return request from the client device; and
      a transmitter adapted to send to the client device, in response to the return request but prior to either the input operation by the user or a selection operation by the user, the estimate of time required for processing, and further wherein the transmitter sends to the client device, prior to receiving the selection operation by the user, the updated estimate of time required for processing in response to the additional return request from the client device, wherein the additional return request is sent from the client device after a predetermined amount of time has elapsed following transmission of the estimate time required for processing prior to the selection operation.

20. The server device of claim 19, wherein the server device further comprises a non-transitory storage medium comprising historical information about required times that have been measured for processing already executed by the server device.

* * * * *